(12) United States Patent
Lammel et al.

(10) Patent No.: US 8,370,391 B2
(45) Date of Patent: Feb. 5, 2013

(54) FUNCTIONAL UPDATES FOR TREE PROCESSING

(75) Inventors: Ralf Lammel, Koblenz (DE); Henricus Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 438 days.

(21) Appl. No.: 12/054,817

(22) Filed: Mar. 25, 2008

(65) Prior Publication Data
US 2009/0248624 A1    Oct. 1, 2009

(51) Int. Cl.
*G06F 17/30* (2006.01)
(52) U.S. Cl. ........................................ 707/791
(58) Field of Classification Search ............... 707/1–3, 707/100
See application file for complete search history.

(56) References Cited

U.S. PATENT DOCUMENTS

| | | | |
|---|---|---|---|
| 6,003,033 A * | 12/1999 | Amano et al. ........................ 1/1 |
| 6,286,010 B1 * | 9/2001 | Ramachandran et al. ............ 1/1 |
| 6,418,446 B1 * | 7/2002 | Lection et al. ........................ 1/1 |
| 6,567,815 B1 * | 5/2003 | Rubin et al. .......................... 1/1 |
| 6,675,351 B1 * | 1/2004 | Leduc ........................... 715/264 |
| 7,013,311 B2 | 3/2006 | Hui et al. |
| 7,036,073 B2 * | 4/2006 | Jones et al. .................... 715/237 |
| 7,058,890 B2 | 6/2006 | George et al. |
| 7,111,233 B1 * | 9/2006 | Ballantyne et al. ........... 715/215 |
| 7,114,147 B2 * | 9/2006 | Ballantyne et al. ........... 717/107 |
| 7,117,216 B2 * | 10/2006 | Chakraborty et al. ............... 1/1 |
| 7,146,565 B2 | 12/2006 | Toyama et al. |
| 7,146,614 B1 | 12/2006 | Nikols et al. |
| 7,350,180 B1 * | 3/2008 | Slavin .......................... 716/103 |
| 7,617,234 B2 * | 11/2009 | Davis et al. .......................... 1/1 |
| 7,730,394 B2 * | 6/2010 | Davis et al. ................... 715/235 |
| 2002/0030699 A1 * | 3/2002 | Van Ee .......................... 345/810 |
| 2002/0091835 A1 * | 7/2002 | Lentini et al. ................ 709/227 |
| 2002/0143521 A1 * | 10/2002 | Call .................................. 704/1 |
| 2003/0041047 A1 * | 2/2003 | Chang et al. ..................... 707/1 |
| 2003/0149934 A1 | 8/2003 | Worden |
| 2003/0236859 A1 | 12/2003 | Vaschillo et al. |
| 2004/0049737 A1 * | 3/2004 | Simon Hunt et al. ......... 715/513 |
| 2004/0060006 A1 | 3/2004 | Lindblad et al. |
| 2006/0129926 A1 | 6/2006 | Malek et al. |
| 2006/0150085 A1 * | 7/2006 | Davis et al. ................... 715/513 |
| 2006/0173865 A1 * | 8/2006 | Fong ............................. 707/100 |
| 2006/0195454 A1 * | 8/2006 | Davis et al. ................... 707/100 |
| 2006/0195783 A1 * | 8/2006 | Davis et al. ................... 715/513 |

(Continued)

OTHER PUBLICATIONS

Boldakov et al. "Transformation of XML Data Using Updates without Side Effects," Institute for System Programming, Russian Academy of Sciences, http://www.maik.ru/cgi-bin/search.pl? type=abstract&name=procom&number=5&year=6&page=255, Apr. 26, 2006, 1 page, Moscow, Russia.

(Continued)

*Primary Examiner* — Sheree Brown

(57) ABSTRACT

An API for functionally updates to data represented in trees, such as XML trees, is provided. Functional updates can be implemented using an update combinator to search for matching nodes and apply an indicated function to those matching nodes. This API can be used in non-functional languages, such as procedural languages or scripting languages. Updates are performed without side effects since a shallow clone is created for at least a portion of a tree. Nodes of the tree can be streamed into memory so that only a portion of a large tree is present in memory at any time. Artificial intelligence can be used by the API to optimize performance under the circumstances, such as optimizing based on node type that is to be updated.

20 Claims, 11 Drawing Sheets

U.S. PATENT DOCUMENTS

2007/0005657 A1* 1/2007 Bohannon et al. ............ 707/200
2008/0098186 A1* 4/2008 Zhou et al. .................... 711/159

OTHER PUBLICATIONS

Bruno et al. "Extending XQuery with Transformation Operators," SIS, Universite de Toulon et du Var, http://delivery.acm.org/10.1145/960000/958223/p1-bruno.pdf?key1=958223&key2=6677319711&coll=GUIDE&dl=GUIDE&CFID=22392843&CFTOKEN=64259011, last accessed May 23, 2007, 8 pages, La Garde Cedex, France.

May et al. "On an XML Data Model for Data Integration," http://www.dbis.informatik.uni-goettingen.de/Publics/01/fmldo01final.ps, Institut fur Informatik, Universitat Freiburg, last accessed May 23, 2007, 16 pages, Germany.

* cited by examiner

```
<company>
  <department deptno="1">
    <label>Leadership department</label>
    <manager>
      <name>Merlin</name>
      <salary>9999</salary>
    </manager>
    <member>
      <department deptno="11">
        <label>
          Planning department
        </label>
        <manager>
          <name>Douglas</name>
          <salary>4200</salary>
        </manager>
        <member>
          <employee>
            <name>Peter</name>
            <salary>4241</salary>
          </employee>
        </member>
      </department>
    </member>
    <member>
      <department deptno="12">
        <label>
          Development department
        </label>
        <manager>
          <name>Fritz</name>
          <salary>42</salary>
        </manager>
        <member>
          <employee>
            <name>Donald</name>
            <salary>5555</salary>
          </employee>
        </member>
        <member>
          <employee>
            <name>Karl</name>
            <salary>3333</salary>
          </employee>
        </member>
      </department>
    </member>
  </department>
</company>
```

FIG. 3A

```
static XElement PayRise(XElement company, double factor)
{
  return
    company.UpdateDescendants(
      "salary",
      s =>
          new XElement("salary",
            (double)s*factor));
}
```

FIG. 4A

```
static XElement CollectXmlBooks(XElement books)
{
  return
    books.UpdateElements(
      "book",
      b =>
          ((string)b.
            Element("title")).
            IndexOf("XML") != -1
          ? b : null);
}
```

FIG. 4B

FUNCTIONAL UPDATES FOR TREE PROCESSING

TECHNICAL FIELD

The subject disclosure relates to updates of computer application data sources represented in a tree, such as functionally updating, deleting, and replacing nodes in an XML tree.

BACKGROUND

Structured data is often used to store large amounts of data for enterprise-class applications and systems. The structured data often contains data related to an organization, such as the organization's inventory, product catalogs, sales, payroll, employees, accounts, locations, customers, vendors. This structured data is increasingly being stored and manipulated in trees, such as XML trees. Unlike relational databases traditionally used to store and manipulate structured data, trees offer a significant number of advantages. For example, trees can better represent hierarchal relationships and are often more portable across different computer platforms and/or different software systems. Moreover, trees, unlike relational database tables, also facilitate transformation into different data representations, such as an alternative representation of the data in the tree. However, unlike relational databases, trees are often not associated with a database server and lack a standard Application Programming Interface (API), such as SQL, that allows both querying and data manipulation (e.g., updating, deleting, inserting, and transforming) data.

Traditionally, tree processing APIs, are inefficient in meeting programmer's needs, which in turn creates problems for developing enterprise—class applications that use trees as a data source. For example, a dichotomy often exists between querying and transformation of data represented in a tree, even though transformations and queries are often used together. As an example, a single transformation often performs one or more queries while transforming the input tree, such as to find those elements and attributes to include in the transformed tree.

As an example, a number of different XML APIs are available for querying, such as Xquery and Linq for XML, and XML transformation, such as XSLT. These XML APIs are often lazy and impure when performing imperative operations, meaning that undesirable side-effects or obscure problems often occur.

For example, when imperative updates are performed on multiple nodes during a transformation, an instance of the "Halloween" problem occurs. In particular, when the first node is deleted or updated, the internal query for matching nodes ceases because the node list is cut off as seen by the ongoing query. Fortunately, APIs calls, such as Linq for XML's ToList( ) function call, are available to take a snapshot of query results before any updates are performed so that the query can continued to be performed on that copy. However, a programmer needs to explicitly call the API function to allow pure updates and many end-user programmers are unaware of the need as evidenced by numerous bug reports. In addition, creating a snapshot is expensive in performance and memory to perform in every transformation, especially if only a few nodes are updated.

In addition, many tree-based APIs are designed to be in-memory APIs, such as a DOM-based API, and are unable to handle extremely large tree datasets that an enterprise-class application would be expected to handle. Complexity is added to an application when more than one API is used depending on the amount of data to be processed. Accordingly, programmers may choose to use slower non-in-memory APIs, even when the tree being processed is small enough to be manipulated using an in-memory API.

Furthermore, many tree processing APIs are not strongly-typed. As a result, API implementations are often unable to catch errors early or optimize their implementations for the input data.

The above-described deficiencies of tree-processing APIs are merely intended to provide an overview of some of the problems of today's tree-processing APIs, and are not intended to be exhaustive. Other problems with the state of the art may become further apparent upon review of the description of various non-limiting embodiments of the invention that follows.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

An API for functionally updates to data represented in trees, such as XML trees, is provided. This API can be used in languages with side-effects, such as object-oriented languages, procedural languages or scripting languages. For example, the API can be used in C#, C, C++, VISUAL BASIC, Pascal, JavaScript or Java.

In one aspect, update combinators are used that parallel XPath-like query axes. These update combinator can be used to search for an indicated element, attribute, comment, processing instruction, text node, or descendant. The matching node can then be updated using an indicated function as part of the update combinator. The update can include deleting the matching node or conditional deleting the matching node.

In at least one embodiment, the API is integrated into and/or extends part of a more-general XML processing API, such as XSLT, Xquery, or LINQ to XML. Advantageously, this facilitates the use of the API by programmers that are already familiar with the more-general XML processing API.

In one aspect, updates are performed without side effects since a shallow clone is created for at least a portion of a tree. Advantageously, the shallow clone can reduce memory requirements and the nodes of the tree can be streamed in memory so that only a portion of a large tree is present in memory at any time.

According to one aspect, artificial intelligence (AI) can be used by the API to enhance its functionality. For example, AI can be used determine whether or not to use an in-memory API depending on various factors (e.g., the size of the tree, memory currently available, number of processes running, etc.). AI can be used to determine how much of the tree to clone when updating. Moreover, AI can be used to optimize the functional update, based on the node type being searched for and/or the XML schema/XML document type definition (DTD) being used.

According to one aspect, the API can implement both synchronous and asynchronous calls to the API. However, in other embodiments, only one type of call can be available. Moreover, the API can be used in distributed applications, where the call is made in a client application and the functional update is performed on a server.

BRIEF DESCRIPTION OF THE DRAWINGS

The system and methods for functional XML processing is further described with reference to the accompanying drawings in which:

FIGS. 3A and 3B illustrate an example XML file and a tree representation of that file.

FIGS. 4A-4B are exemplary source code snippets that uses the tree manipulation API according to one embodiment.

DETAILED DESCRIPTION

As discussed in the background, imperative updates of trees often are associated with undesirable side effects. Hence, functional updates are used to update one or more nodes of a tree. Since the API automatically clones at least a portion of the tree, an end-user programmer does not need to explicit create a copy or create a list of the nodes as a programmer does in imperative updates to avoid the Halloween problem.

Figure 1:
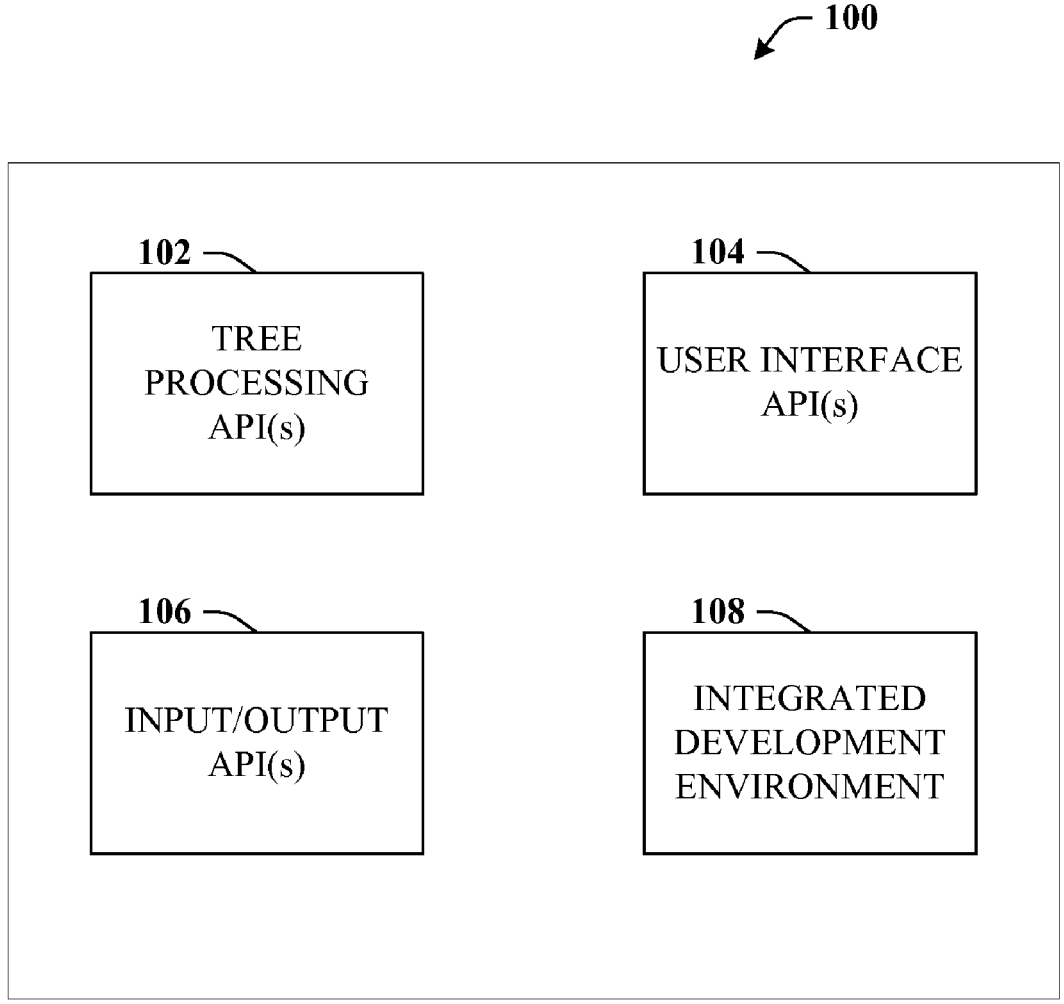
FIG. 1 is a block diagram of an exemplary development environment in which the described tree manipulation API can be utilized.

Referring to FIG. 1, a development environment 100 in which a programmer uses an Application Programming Interface (API) that provides functional updates is illustrated. The illustrated environment 100 includes various APIs as well as an integrated development environment 108. The integrated development environment 108 includes various development tools, such as compilers, interpreters, debuggers, a text editor, a make utility, and a project manager, used to write source code, build the application, and test the application.

A programmer writes source code using various APIs that will be compiled or interpreted to provide various functionality. The APIs can be associated with a particular programming language (e.g., Visual Basic, C++, Javascript, Pascal, C, C#) or managed code environment (e.g., .NET, Java virtual machine). In the illustrated environment, there is the tree processing API 102, a user interface API 104, and an input/output API 106. The user interface API creates a user interface that is displayed to a user and responds to the user's input. The input/output API controls provides access to various input/output devices, such as the printer or a network card. Additional functionality is written by the programmer using the language constructs of one or more programming languages used to develop the application. For example, the business logic of an application is typical written using language constructs in combination with API calls. One will appreciate additional APIs can be used by the programmer, such as a data access API (e.g., SQL, ODBC, ADO, etc.) or a shell API (e.g., to execute programs, create shell extensions, etc.). Furthermore, one will appreciate that functionality can be combined in different manners to produce more or less APIs.

Figure 2:
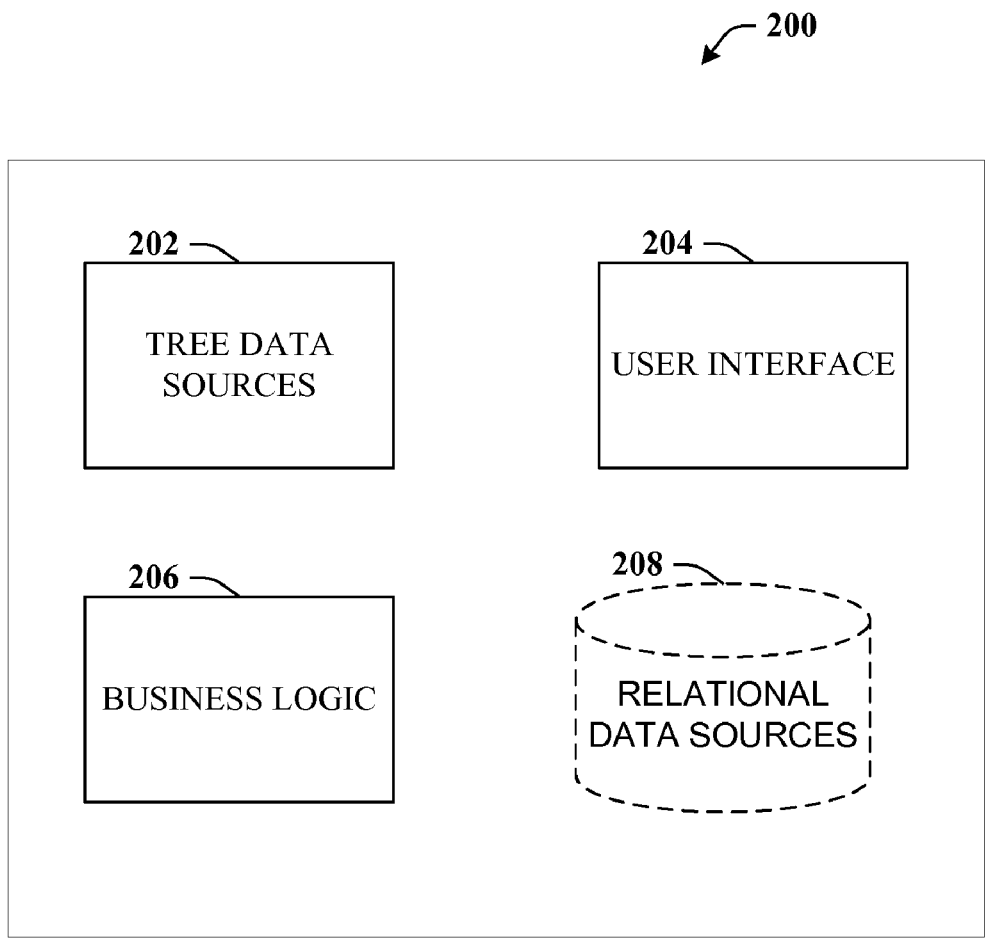
FIG. 2 is a block diagram of an exemplary enterprise—class application system in which the tree manipulation APIs can be used

After the programmer develops the application, the application can be used by computer users. FIG. 2 illustrates an example enterprise-class application 200 that uses the described functional updates according to one embodiment. The application comprises one or more tree data sources, such as XML files, that store data being manipulated using the application. Data can be also be optionally stored in one or more relational data sources 208. The user interface 204 provides the user with an interface to interact with the application. For example, a graphical user interface, command line interface, or speech recognition/text to speech interface can be presented to the user. The business logic 206 provides logic for performing the functionality associated with the application. This business logic can include querying and updating the tree data sources.

One will appreciate that an enterprise application can be a distributed, multi-tiered application that distributes its functionality between different components that can be one or more computers. For example, the enterprise application can be a client-server application. In this case, in at least one embodiment, although the API call to update can be executed on the client, the functional update can occur on a software component on the server. As an example, the update combinator can be sent to the server for update processing (ala SQL updates).

FIG. 3A illustrates an XML file 300. As discussed more fully below, other tree representation can be functionally updated other than XML. Moreover, one will appreciate that the XML does not need to come from a file but can instead be streamed from a server.

Figure 3B:
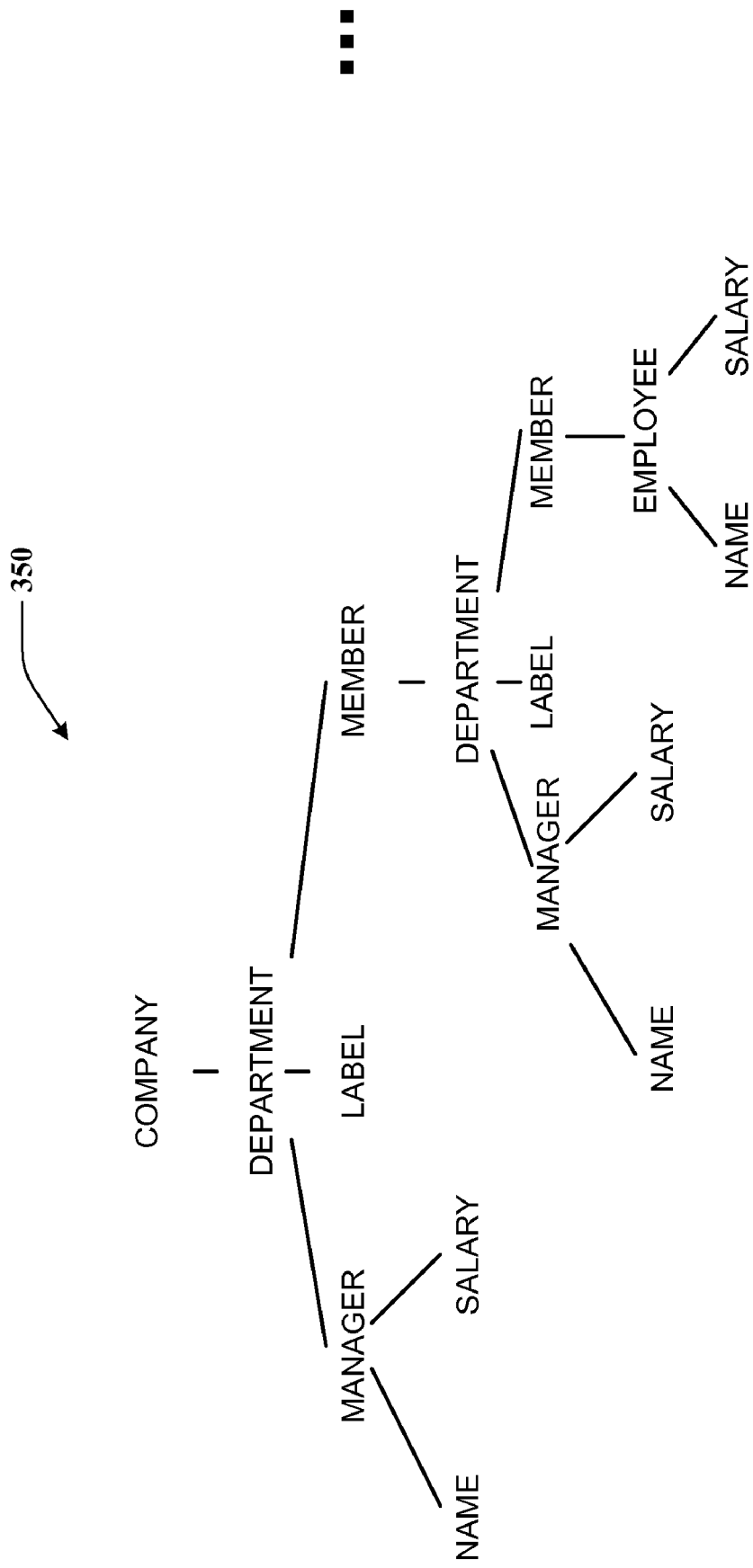

In particular, the XML file in FIG. 3A is an XML file that represents the organizational structure of a company. One will realize that this is only an exemplary scenario and any XML vocabulary can be used with the functional update API. Each employee or manager has various elements associated with them, namely an element named name and salary. FIG. 3B illustrates a tree representation 350 of a portion of the XML file 300 of FIG. 3A.

According to one scenario, it is desired to increase all salaries by a predetermined factor. Since the salary elements can be contained within multiple elements (e.g., manager, and employee), there is no easy manner of encoding the problem using traditional query-oriented transformation style without recursive functions.

Using functional updates, this can be performed using x.Updatedescendants(n, f), where n is the element label to match and f is a function to apply to a matched node. The function with the parameters filled in is called an update combinator. Other update combinators include x.UpdateElements(n, f), x.UpdateTopMost(n, f) or x.UpdateArguments (n,f). Some update combinators UpdateElements(f) match all nodes and be used to apply a function to all nodes. In each case, the update combinators reconstruct the input tree as they descend into the tree.

Update combinators for descendants recurse into the incoming element while searching for matching nodes. In the case of an optimized UpdateDescendants, the recursion performs a full traversal. In the case of UpdateTopMosts, recursion ceases if a suitably named element is encountered.

For some or all of the combinators, the argument function can express deletion by returning null for a given element (or node). Insertion can be allowed by creating a new XElement object with the appropriate children nodes and attributes, if any. The definition of the functional update combinator for descendants can assume a bottom-up order or top-down order and can be optimized at run-time depending on the input tree. Other variations and controls can be useful, as known from the art of generic functional programming.

Update combinators can align with important XPath-like query axes. Just as much additional query axes can be introduced or prioritized, additional functional combinators can be defined in reply.

In one embodiment, the functional update API can be built on top of the LINQ to XML functions that generally perform imperative updates. However, update combinators can be built on top of other tree processing APIs.

Sharing and optimization techniques can be also be used to enhance performance. For instance, when node identity is not observable (not observed) by the queries and transformations, then optimizations can actually avoid cloning for arbitrarily large subtrees along functional updates—if no changes are performed. Also, when the parent axis is not observable (not observed) by the queries and transformations, then identical subtrees can be shared for their occurrences in the input and the output of the transformation.

Functional updates can be used while streaming an input tree. If a given transformation is assembled from functional updates that only point downward (as all of the exemplary combinators), then the cloning part of the functional updates can be directly mapped to copy semantics on serialized input and output.

Functional updates also provide a discipline for the XSLT-style of programming. XSLT templates directly encode recursion on the input tree without any use of combinators. Thus, XML query language like XQuery can be enhanced to cover the key expressivity of XSLT by incorporating functional updates. It is important to notice that the XSLT style of transformation is indeed functional—as opposed to imperative updates of LINQ to XML or the Update Facility under way for XQuery.

FIG. 4A illustrates an exemplary code snippet 400 that uses the described API to update the salaries by a factor. One will appreciate though that functional updates can be used in other programming languages. "Salary" is the element to match on and "s=>new XElement("salary", (double) s*factor))" is the function to apply. When this is run on the XML illustrated in FIG. 3A, salaries are raised by the factor.

FIG. 4B illustrates a code snippet 450 for another scenario. The user wants to an xml file of book elements to exclude all books whose title does not contain "XML" are omitted. In this code, the condition ? true: false language construct is used to delete the book node if the title element does not include XML by setting it to null. Otherwise, the node b is simply retained as is.

Although simple functions are used for the sake of clarity, one will appreciate that more complex function can be utilized. For example, a function can raise salaries by different factor in various tiers.

Advantageously, the function update API can be implemented as an enhancement to a more-general XML or SGML processing API, such as XQuery or XSLT. One will also appreciate that the API can be implemented in other programming languages, including object-oriented, procedural, declarative, scripting, compiled, or interpreted programming languages.

The described tree manipulation API is not limited to XML trees. For example, an SGML tree can also be manipulated using the API. In addition, trees can be created from external data, such as a configuration file that specifies different hierarchical settings (e.g., global and local settings). As an example, a non-XML configuration file for a web server with different inherited settings for different directories or domains can be transformed into a tree that can then be updated using functional updates.

Figure 5A:
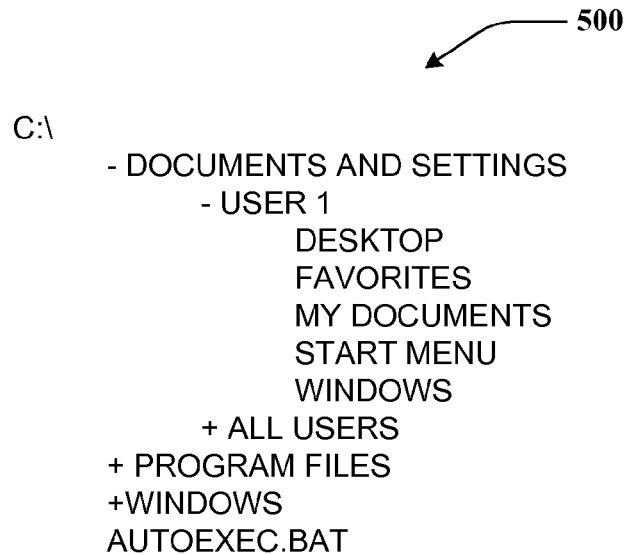
FIGS. 5A-5B illustrate tree representations other than XML that can be functionally updated using the API.
Figure 5B:
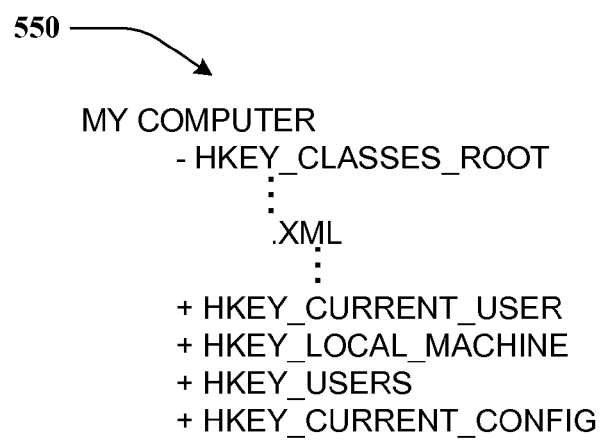

FIGS. 5A-5B illustrate additional examples. FIG. 5A is a directory listing 500. The directory listing, which is already a tree, can be combined with associated metadata, such as file creation date, modification date, access rights, etc. This tree can then be functionally updated with new settings associated with files or folders, such as access rights, or updated and then synchronized with one set of files or directories to another locations, such as a backup computer.

FIG. 5B illustrates a tree of settings in a computer's registry. The registry provides a central store for various configuration options for software applications and the operating system. A subtree of the registry can be exported and functionally updated in accordance with one embodiment. For example, if file locations are specified in the registry and large number of files are moved to another drive letter, functional updates can be used to update the settings with the drive letter and then save the new registry settings to the registry. An installation program or update program can use an exported subtree to update various settings in multiple registry locations.

Figure 6:
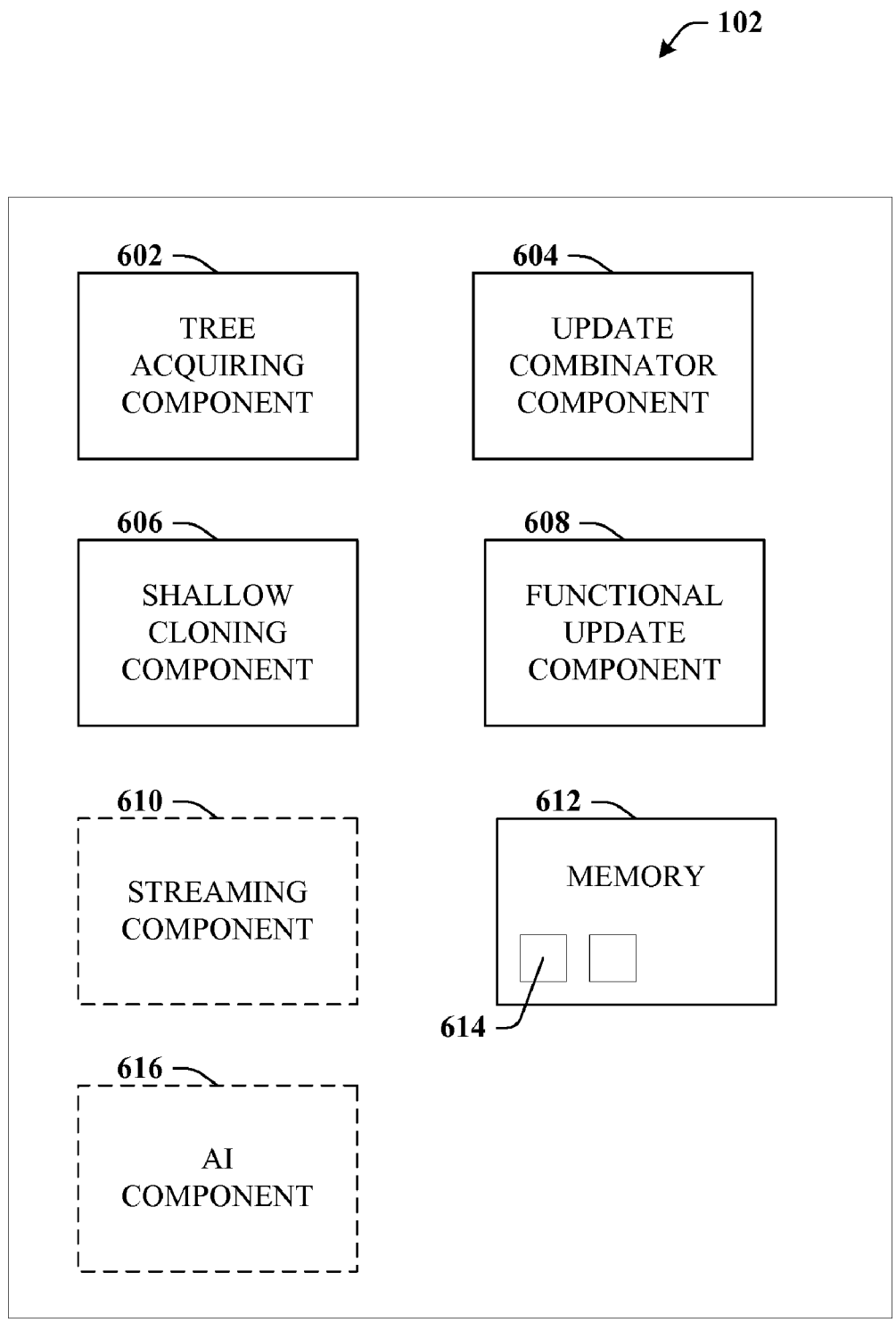
FIG. 6 is a block diagram of the example system components for functionally updating an XML file.

FIG. 6 illustrates a system according to one embodiment that implements the API 102. A tree acquiring receives an indication of an input tree. For example, it can receive an indication of an XML file or an XML stream. The update combinator component 604 receives an indication of an update combinator. The update combinator states a node to match, such as an element, descendant, attribute, processing instruction, text node, or comment, and a function to apply to each matched node. The shallow cloning component 606 can clones one or more portions of the input tree that includes a matching node corresponding to the update combinator. The functional update component 608 can apply the indicated function of the update combinator to the cloned portion of the tree. The indicated function can delete the matched node, such as by setting the node equal to null.

An optional streaming component 610 can be used to limit the amount of memory 612 used, such as to a predetermined amount 614. The optional streaming component can limit the memory used by streaming the tree rather than placing the entire tree in memory.

One will appreciate that other components (not shown) can be used to optimize the search or applying the function. For example, if the indicated function is complex and there are many nodes to updates, the output value for the function for a given input can be cached. Although this takes additional memory, if the same input value occurs many times (e.g., salaries are being updated and all employees for a given job and experience level are paid the same) and the function is sufficiently complex, the running time of the update can be reduced.

Figure 7:
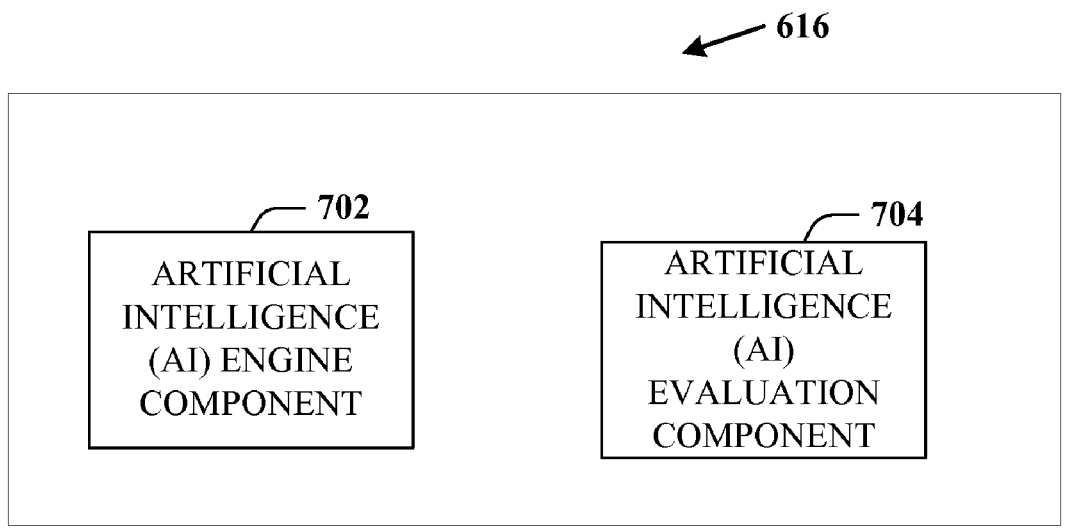
FIG. 7 illustrates an artificial intelligence component that can be used to enhance the tree manipulation API.

An optional artificial intelligence component 616 can be used to further optimize the search and/or the functional updates. FIG. 7 illustrates the artificial intelligence component 616 of FIG. 6. Specifically, artificial intelligence engine and evaluation components 702, 704 can optionally be provided to implement aspects of the subject invention based upon artificial intelligence processes (e.g., confidence, inference). For example, the artificial intelligence component 616 can use artificial intelligence to optimize the query for matching nodes or applying the indicated function. For example, the artificial intelligence component can utilize the XML schema and/or XML DTD associated with the XML tree being processed to determine whether an element can be a descendant of another element and if not, the search of that subtree can be skipped. Moreover, artificial intelligence can be used to determine whether and how much memory to use given the size of the tree and the expected number of updates. As yet another example, AI can be used to determine if additional updates will later be performed on the tree and thus the tree should remain in memory.

The use of expert systems, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated by the AI engine 702. These training techniques can be calibrated using exemplary operations that are periodically performed.

In addition, the AI component can be utilized at run-time to perform these operations or during compilation of the source code, or any combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Figure 8:
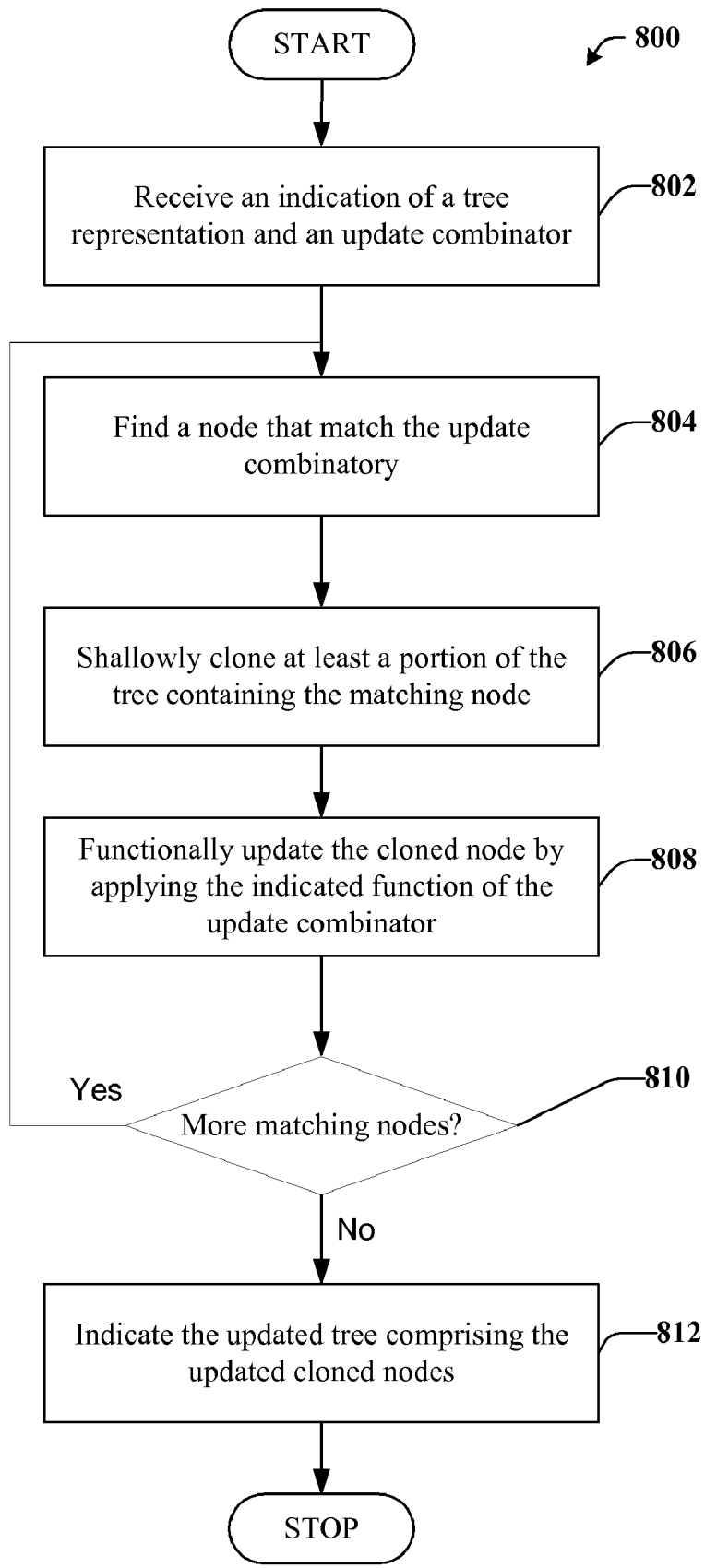
FIG. 8 is a flow diagram of a method of the functional updates according to one embodiment.
Figure 9:
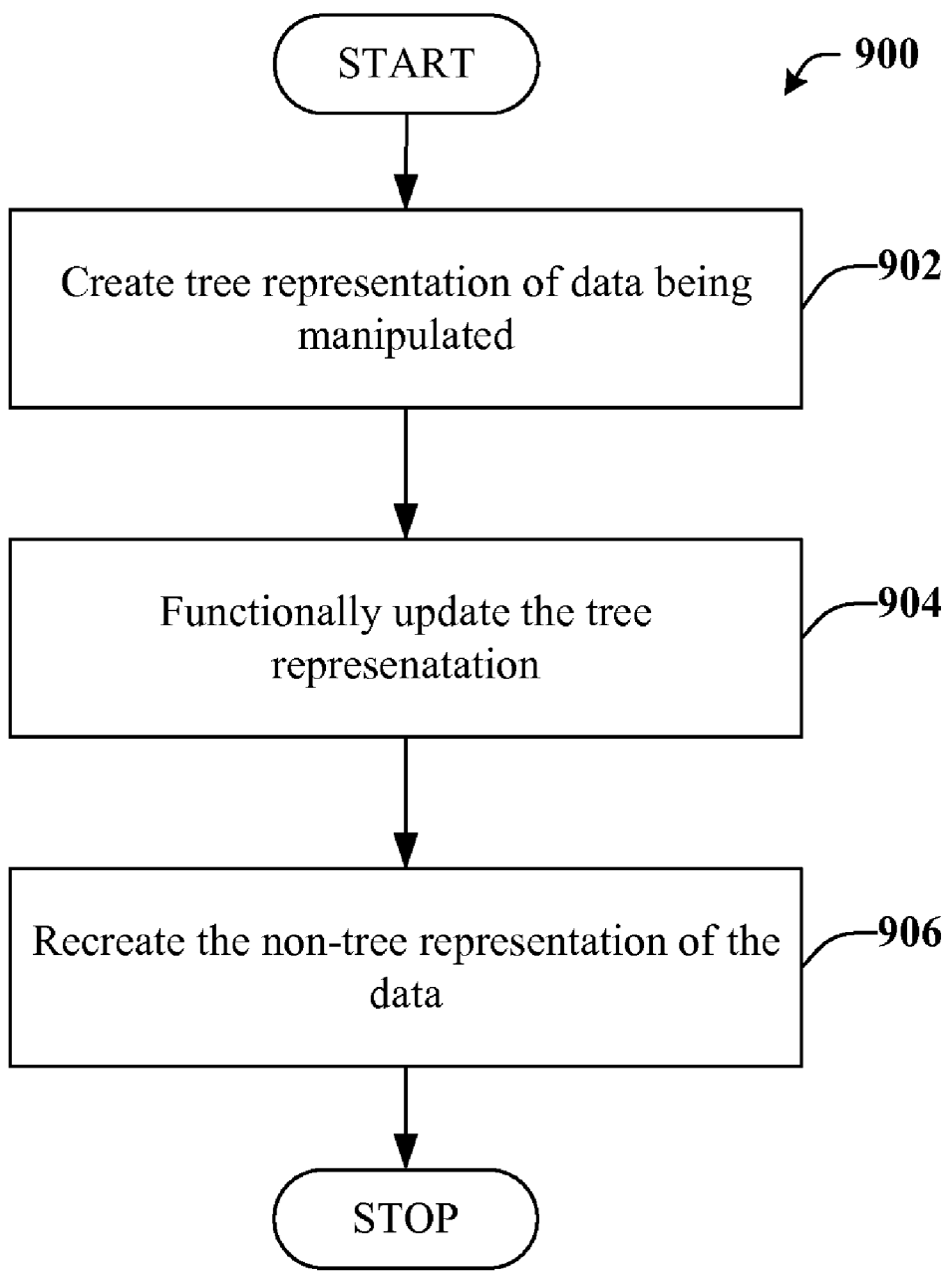
FIG. 9 is a flow diagram of method of using functional updates in an application according to one embodiment.

In view of the exemplary systems described supra, methodologies that may be implemented in accordance with the disclosed subject matter will be better appreciated with reference to the flowcharts of FIGS. 8 and 9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

FIG. 8 is a method 800 of the tree manipulation API according to one embodiment. At 802, an indication is received of a tree representation and an update combinatory. For example, the programmer can provide appropriate parameters in source code that indicate a tree (or a subtree) to update, the update combinator, and a function to apply to update the tree. At 804, a node that matches the update combinatory is found. For example, nodes can be queried to see if the node matches the update combinator. At 806, a shallow clone containing of at least a portion of the tree containing the matching node is made. At 808, the cloned is functionally updated using the indicated function. At 810, it is determined if there are more matching nodes and if so, the method returns to 804 to find another node that matches the update combinatory. If at 810 it is determined that there are not more matching nodes, the method proceeds to 812 where the updated tree comprising the updated nodes is indicated. As part of 812, the updated cloned portions of the updated tree are combined.

One will appreciate that, when the tree being manipulated is relatively small, the entire tree can be cloned and updates performed on the cloned tree. Moreover, the tree can be kept in memory if this known that additional updates will be performed on the tree.

FIG. 9 is a method 900 of using the tree manipulation API in an application program according to one embodiment. At 902, a tree is created representing the data being manipulated. For example, an application can provide XML export functionality or the tree can be created from data in one or more tables of a relational database. In other embodiments, a tree to manipulate can be created from a directory tree or the registry tree and its associated metadata. At 904, the created tree representation is functionally updated using the API described herein. For example, the method 800 of FIG. 8 can be executed on the created tree. At 906, the non-tree representation of the data can be re-created. For example, XML import functionality of an application can be used to import data back into an application. As a second example, the updated directory tree can be saved to the disk, moving files or changing properties (e.g., access rights) as appropriate indicated in the updated tree.

One will appreciate that FIG. 9 illustrates only an example application that uses the described tree manipulation API. As described previously, the tree manipulation API can be used in an enterprise-class application that use XML data sources directly and thus there is no need to create the tree representation and/or re-create the non-tree representation.

The invention applies to any device wherein it may be desirable to manipulate data represented in a tree. It should be understood, therefore, that desktop, handheld, portable and other computing devices and computing objects of all kinds are contemplated for use in connection with the present invention, i.e., anywhere that a device may process or store data represented in a tree. Accordingly, the below general purpose remote computer described below in FIG. 10 is but one example, and the present invention may be implemented with any client having network/bus interoperability and interaction.

Although not required, the invention can partly be implemented via an operating system, virtual machine, or browser environment, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

Figure 10:
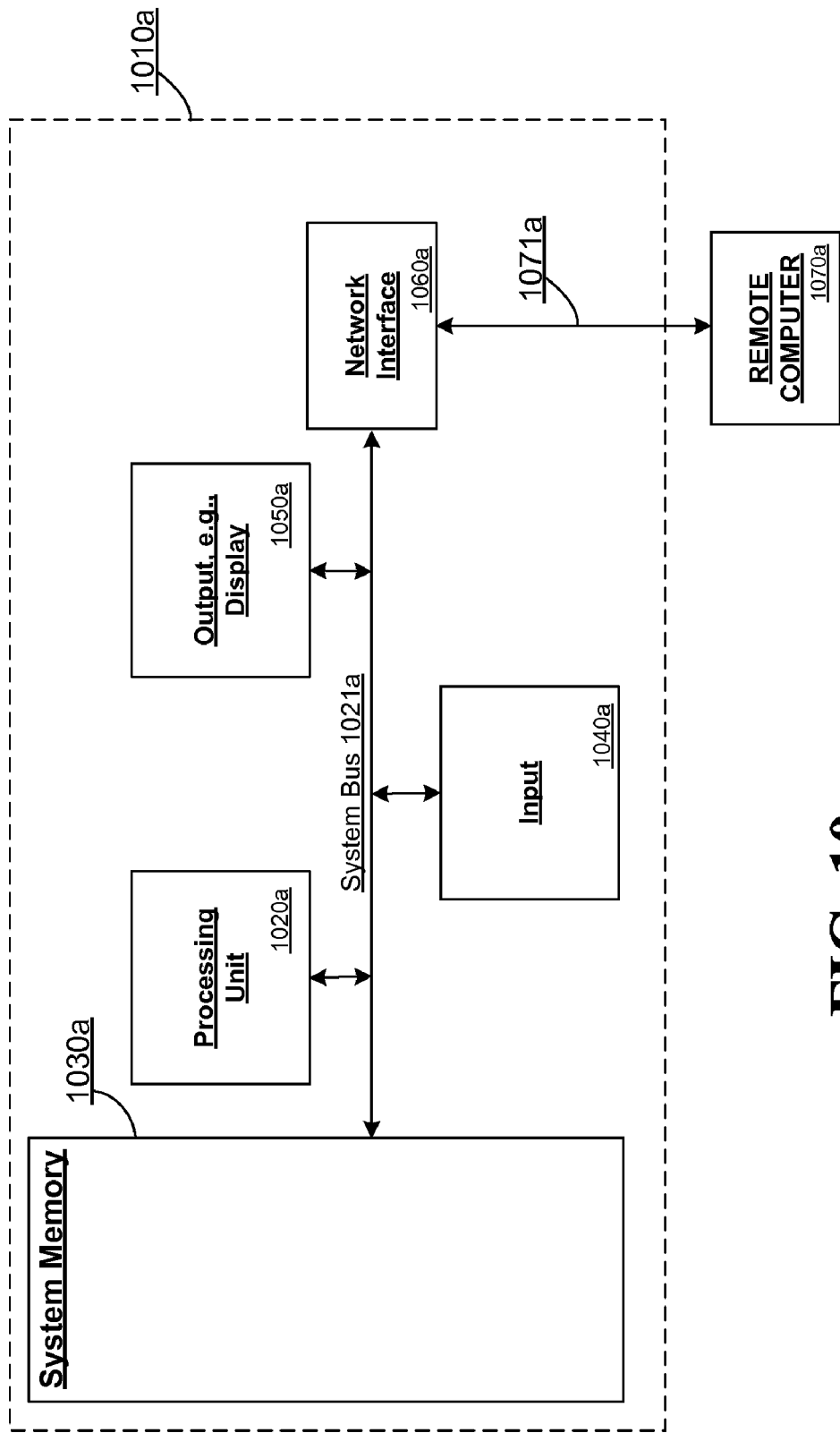
FIG. 10 is a block diagram representing an exemplary non-limiting computing system or operating environment in which the present invention may be implemented.

FIG. 10 thus illustrates an example of a suitable computing system environment 1000*a* in which the invention may be implemented, although as made clear above, the computing system environment 1000*a* is only one example of a suitable computing environment for tree data manipulation. It is not intended to suggest any limitation as to the scope of use or functionality of the invention. Neither should the computing environment 1000*a* be interpreted as having any dependency or requirement relating to any one or combination of components illustrated in the exemplary operating environment 1000*a*.

With reference to FIG. 10, an exemplary computing device for implementing the invention includes a general purpose computing device in the form of a computer 1010a. Components of computer 1010a may include, but are not limited to, a processing unit 1020a, a system memory 1030a, and a system bus 1021a that couples various system components including the system memory to the processing unit 1020a. The system bus 1021a may be any of several types of bus structures including a memory bus or memory controller, a peripheral bus, and a local bus using any of a variety of bus architectures.

Computer 1010a typically includes a variety of computer readable media. Computer readable media can be any available media that can be accessed by computer 1010a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010a. Communication media typically embodies computer readable instructions, data structures, program modules or other data in a modulated data signal such as a carrier wave or other transport mechanism and includes any information delivery media.

The system memory 1030a may include computer storage media in the form of volatile and/or nonvolatile memory such as read only memory (ROM) and/or random access memory (RAM). A basic input/output system (BIOS), containing the basic routines that help to transfer information between elements within computer 1010a, such as during start-up, may be stored in memory 1030a. Memory 1030a typically also contains data and/or program modules that are immediately accessible to and/or presently being operated on by processing unit 1020a. By way of example, and not limitation, memory 1030a may also include an operating system, application programs, other program modules, and program data.

The computer 1010a may also include other removable/non-removable, volatile/nonvolatile computer storage media. For example, computer 1010a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1021a through a non-removable memory interface such as an interface, and a magnetic disk drive or optical disk drive is typically connected to the system bus 1021a by a removable memory interface, such as an interface.

A user may enter commands and information into the computer 1010a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1020a through user input 1040a and associated interface(s) that are coupled to the system bus 1021a, but may be connected by other interface and bus structures, such as a parallel port, game port or a universal serial bus (USB). A graphics subsystem may also be connected to the system bus 1021a. A monitor or other type of display device is also connected to the system bus 1021a via an interface, such as output interface 1050a, which may in turn communicate with video memory. In addition to a monitor, computers may also include other peripheral output devices such as speakers and a printer, which may be connected through output interface 1050a.

The computer 1010a may operate in a networked or distributed environment using logical connections to one or more other remote computers, such as remote computer 1070a. The remote computer 1070a may be a personal computer, a server, a router, a network PC, a peer device or other common network node, or any other remote media consumption or transmission device, and may include any or all of the elements described above relative to the computer 1010a. The logical connections depicted in FIG. 10 include a network 1071a, such as a personal area network (PAN), a local area network (LAN) or a wide area network (WAN), but may also include other networks/buses. Such networking environments are commonplace in homes, offices, enterprise-wide computer networks, intranets and the Internet.

When used in a LAN networking environment, the computer 1010a is connected to the LAN 1071a through a network interface or adapter. When used in a WAN networking environment, the computer 1010a typically includes a communications component, such as a modem, or other means for establishing communications over the WAN, such as the Internet. A communications component, such as a modem, which may be internal or external, may be connected to the system bus 1021a via the user input interface of input 1040a, or other appropriate mechanism. In a networked environment, program modules depicted relative to the computer 1010a, or portions thereof, may be stored in a remote memory storage device. It will be appreciated that the network connections shown and described are exemplary and other means of establishing a communications link between the computers may be used.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for tree data manipulation in accordance with the invention can be included in, supported in or accessed via all of the languages and services enabled by a managed code framework, such as .NET code, and in other computing languages frameworks as well.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

While exemplary programming languages, names and examples are chosen herein as representative of various choices, these languages, names and examples are not intended to be limiting. One of ordinary skill in the art will appreciate that there are numerous ways of writing code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the tree manipulation functionality of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

While the present invention has been described in connection with the preferred embodiments of the various figures, it is to be understood that other similar embodiments can be produced or modifications and additions can be made to the described embodiment for performing the same function of the present invention without deviating therefrom. For example, while exemplary network environments of the invention are described in the context of a networked environment, such as a client-server networked environment, one skilled in the art will recognize that the present invention is not limited thereto, and that the methods, as described in the present application can apply to any computing device or environment, such as a mainframe, laptop, desktop, server, etc., whether wired or wireless, and can be applied to any number of such computing devices connected via a communications network, and interacting across the network.

While exemplary embodiments refer to utilizing the present invention in the context of particular programming language constructs, the invention is not so limited, but rather may be implemented in any language to provide methods for functional updating trees.

Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for functional updating data represented in a tree comprising the steps of:
  receiving an indication of an XML file or an XML stream to update in an input tree;
  receiving an indication of an update combinator, the update combinator indicating nodes to match and a function to apply to nodes matching the update combinator;
  optimizing a query to search for matching nodes based on the input tree at least in part by utilizing an XML schema associated with the input tree to determine whether a search of an associated subtree can be skipped;
  finding at least one node in the input tree matching the update combinator using the optimized search;
  cloning one or more portions of the input tree that include a matching node corresponding to the update combinator;
  streaming portions of the input tree respectively corresponding to a matched node, wherein only a portion of the input tree is streamed into memory at any given time;
  updating a cloned portion of the at least one node in the input tree on a server by applying the function indicated by the update combinator;
  determining an amount of memory to be used based on a size of the input tree and an expected number of updates; and outputting an output tree comprising updated nodes.

2. The method of claim 1, the receiving of an indication of data represented in an input tree including receiving an indication of a non-XML tree.

3. The method of claim 1, further comprising limiting the streaming so that the memory used in representing the input tree does not exceed a predetermined amount of memory.

4. The method of claim 1, including receiving of the indication of the update combinator and the receiving of the indication of the function to apply via an application programming interface (API).

5. The method of claim 4, the receiving of the indication of the update combinator including receiving the indication in at least one of an interpreted programming language, a declarative programming language, a compiled programming language, an object-oriented programming language, a procedural programming language, or a scripting programming language.

6. The method of claim 1, including matching, in at least one of the matching nodes, one of a subtree, an attribute, an element, a comment, a processing instruction, or a text node.

7. The method of claim 1, the cloning at least a portion of the input tree comprising the matched node including cloning a subtree of the input tree comprising the matched node.

8. The method of claim 1, the receiving of the indication of the input tree comprising creating the input tree from a non-tree representation of data.

9. The method of claim 1, the utilizing the XML schema comprising determining whether an element of the input tree can be a descendant of another element and skipping the search of the associated subtree based on the determining.

10. A tree data processing system comprising:
a memory;
a tree acquiring component configured to receive an indication of an XML file or an XML stream to update in an input tree and store at least a portion of the input tree in the memory;
an update combinator component configured to receive an indication of an update combinator, the update combinator specifying nodes to match and an indicated function to apply to matched nodes;
shallow cloning component configured to clone one or more portions of the input tree that include a matching node corresponding to the update combinator;
a streaming component configured to limit a streaming of the one or more portions of the input tree so that only a portion of the input tree is streamed into memory at any given time, each portion including a respective matching node corresponding to the update combinator;
a functional update component configured to apply the indicated function of the update combinator to a cloned portion of the input tree;
an artificial intelligence component configured to optimize a search for matching nodes based on the input tree, at least in part by utilizing an XML schema associated with the input tree to skip a search of at least one subtree of the input tree, the artificial intelligence component further configured to determine an amount of memory to be used based on a size of the input tree and an expected number of updates.

11. The tree data processing system of claim 10, wherein the memory is limited, and wherein the streaming component is further configured to maintain the at least a portion of the tree within the memory as limited.

12. The tree data processing system of claim 10, wherein the update combinator component resides on a first computer and the functional update component resides on a disparate second computer.

13. The tree data processing system of claim 10, wherein the update combinator comprises an argument function configured to express deletion by returning null for a given element.

14. The tree data processing system of claim 10, the artificial intelligence component being further configured to determine how much of the memory to use for the input tree, based on a size of the input tree and an expected number of updates.

15. A computer-readable storage medium tangibly embodying computer-executable instructions configured to, in response to execution by at least one computing device, cause operations comprising:
receiving an indication of an XML file or an XML stream to update in an input tree, and an update combinator, the update combinator including a function to apply to nodes matching the update combinator;
optimizing a query to search for nodes matching the update combinator at least partly by skipping a search of a subtree associated with the input tree based on an XML schema associated with the input tree;
searching for at least one node in the input tree matching the update combinator using the optimized search;
cloning one or more portions of the input tree that include a matching node corresponding to the update combinator;
streaming portions of the input tree respectively corresponding to a matched node, wherein only a portion of the input tree is streamed into memory at any given time;
updating a cloned portion of the at least one node in the input tree by applying the function indicated by the update combinator;
determining an amount of memory to be used based on a size of the input tree and an expected number of updates; and
outputting an output tree comprising updated nodes.

16. The computer-readable storage medium of claim 15, the operations further comprising:
reconstructing the input tree while descending into the input tree; and
performing recursion into an incoming element while searching for a matching node.

17. The computer-readable storage medium of claim 15, the operations further comprising utilizing artificial intelligence to determine how much of the input tree to clone.

18. The computer-readable storage medium of claim 15, the operations further comprising receiving, as the input tree, other than an XML tree.

19. The computer-readable storage medium of claim 15, the operations further comprising interfacing with at least one of C#, Visual Basic, C, C++, Pascal, Java or Javascript.

20. The computer-readable storage medium of claim 15, the operations further comprising storing the input tree in a memory, and utilizing artificial intelligence to determine whether the input tree should remain in the memory based on determining whether additional updating will be performed on the tree.

* * * * *